(12) United States Patent
Matts et al.

(10) Patent No.: US 7,165,353 B2
(45) Date of Patent: Jan. 23, 2007

(54) INSECT SUPPRESSION STATION

(75) Inventors: Emory Hutchins Matts, St. Paul, MN (US); S. John Barcay, Burnsville, MN (US); Scott Alan Meyer, Minneapolis, MN (US); Thomas D. Nelson, Maplewood, MN (US); Jeremy John Hansen, South St. Paul, MN (US)

(73) Assignee: Ecolab Inc., St. Paul, MN (US)

( * ) Notice: Subject to any disclaimer, the term of this patent is extended or adjusted under 35 U.S.C. 154(b) by 0 days.

(21) Appl. No.: 10/697,705

(22) Filed: Oct. 29, 2003

(65) Prior Publication Data
US 2005/0091911 A1    May 5, 2005

(51) Int. Cl.
*A01M 1/20* (2006.01)
(52) U.S. Cl. ...................................................... 43/131
(58) Field of Classification Search ....... 43/131–132.1, 43/133, 136, 124
See application file for complete search history.

(56) References Cited

U.S. PATENT DOCUMENTS

| 4,266,363 | A |   | 5/1981  | Chen |
| 4,563,836 | A | * | 1/1986  | Woodruff et al. ............. 43/131 |
| 4,608,774 | A |   | 9/1986  | Sherman |
| 4,782,621 | A |   | 11/1988 | Wissman |
| 4,793,093 | A |   | 12/1988 | Gentile |
| 4,800,672 | A |   | 1/1989  | Jackson |
| 4,823,505 | A |   | 4/1989  | Jackson |
| 4,837,969 | A |   | 6/1989  | Demarest |
| 4,841,669 | A | * | 6/1989  | Demarest et al. ............. 43/131 |
| 5,048,225 | A |   | 9/1991  | Brandli |
| 5,090,153 | A |   | 2/1992  | Mullen et al. |
| 5,119,586 | A |   | 6/1992  | Townsend |
| 5,182,879 | A |   | 2/1993  | Hopkins |
| 5,238,681 | A |   | 8/1993  | Chang et al. |
| 5,406,744 | A |   | 4/1995  | Schneider et al. |
| 5,528,854 | A |   | 6/1996  | Antonali et al. |
| 5,775,026 | A |   | 7/1998  | Pearce et al. |
| 5,802,761 | A |   | 9/1998  | Demarest et al. |
| 5,873,193 | A |   | 2/1999  | Jensen |
| 5,918,410 | A |   | 7/1999  | Knuppel |
| 5,927,001 | A |   | 7/1999  | Ballard et al. |

(Continued)

OTHER PUBLICATIONS

Globe Australia Pty. Ltd. website including photos and description of "The NEW Roguard Insect Station," 5 pages, in color. Product is stated to have been available as of Feb. 2001 in Australia.

(Continued)

*Primary Examiner*—Teri Pham Luu
*Assistant Examiner*—Kimberly S. Smith
(74) *Attorney, Agent, or Firm*—Andrew D. Sorensen; Annaliese S. Mayer (57) ABSTRACT

An insect station for luring insects, baiting insects, trapping insects, monitoring insects or any combination of these functions includes a cover that can be moved to provide access to selected insect suppression devices, such as glueboards or baited pads. The insect station may have two changeable pad areas situated facing each other to provide a compact design. In addition, a base portion of the station may have a wall access opening to facilitate applying insecticide behind a wall. The insect station of the present invention may be used with any combination of attractant pads, bait, and glueboards, as well as many other insect suppression devices.

38 Claims, 8 Drawing Sheets

U.S. PATENT DOCUMENTS

| | | | |
|---|---|---|---|
| 5,953,854 | A | 9/1999 | Hyatt |
| 5,960,585 | A | 10/1999 | Demarest et al. |
| 5,983,558 | A | 11/1999 | Las et al. |
| 6,079,150 | A | 6/2000 | Setikas et al. |
| 6,151,828 | A | 11/2000 | Genero et al. |
| 6,272,791 | B1* | 8/2001 | Pleasants ............ 43/131 |
| 6,370,813 | B1 | 4/2002 | Nelson et al. |
| 6,378,243 | B1* | 4/2002 | Snell et al. ............ 43/131 |
| 6,401,384 | B1 | 6/2002 | Contadini et al. |
| 6,409,019 | B1* | 6/2002 | Hornsby et al. ............ 206/471 |
| 6,502,348 | B1 | 1/2003 | Bernard |
| 6,594,948 | B1* | 7/2003 | Novack ............ 43/131 |
| 6,789,352 | B1* | 9/2004 | Price et al. ............ 43/131 |
| 6,792,713 | B1 | 9/2004 | Snell ............ 43/124 |
| 6,796,082 | B1* | 9/2004 | Duston et al. ............ 43/131 |
| 6,807,768 | B1* | 10/2004 | Johnson et al. ............ 43/131 |

OTHER PUBLICATIONS

Roguard™ Insect Detector brochure, 2 pages, believed to be available before Oct. 29, 2003.

"Aegis Insect Monitor," *Aegis by Lipha Tech*, http://www.liphatech.com/ Aegis_Insect_Monitor.html, 1 page. (Date Printed Jul. 21, 2003).

Catalog of Beneficials, *Rincon-Vitova Insectaries, Inc.*, www.rinconvitova.com, pp. 1, 8 and 40 showing "Silent George" trap (2003).

"Catchmaster Sticklers for Quality™ : Professional-Insect And Roach," *Catchmaster*, http://www.catchmaster.com/pcoroach.htm, 4 pages (Date Printed Jul. 21, 2003).

"Crawling Insects," *PIC Corporation—Dependable Insect and Rodent Control since 1953*, http://www.pic-corp.com/www/consumer/largecontrl.htlm, 1 page (Date Printed Jul. 21, 2003).

"D-Sect™ station," *Rockwell Labs, Ltd.*, http://www.rockwelllabs.com/d-sect.htm 2 pages (Date Printed Sep. 24, 2003).

"Maxattrax Ultra™ Roach Bait," *Hot Shot*, http://www.homeandgardensolutions.com/products/products-hs-maxultra-rb.html, 1 page (Date Printed Jul. 21, 2003).

Pest Control, http://www.shootforthestars.com/body_pest_control.html, 5 pages (Date Printed Aug. 29, 2003).

"PCT Pest Control Technology: Roach Terminal," *Cleary Chemical*, http://www.pctonline.com/product/detail.asp?Id=144, 2 pages (Date Printed Jul. 21, 2003).

"Protecta® Pest Monitor, " *Bell Laboratories Inc.*, http://www.belllabs.com/cgi/products.cgi?op=p&nm=domepestmo, 1 page (Date Printed 4/27/04).

"Protecta® Pest Monitor: Improved Monitor for Mice and Insects; Protecta® RTU® : Tamper-Resistant Mouse Bait Station," 1 page (Date Unknown).

"Roach Bait Stations," *Wilson*, http://www.wilson.nu-gro.com/products/findItem.asp?srch=0+65797+30380+2, 1 page (Date Printed Jul. 21, 2003).

Residex: New Product Technology Maxforce Refillable Bait Station, *Residex*, http://www.residex.com/new_products.asp, 2 pages (Date Printed Jul. 21, 2003).

"Seabright Roach Free™ System," *Seabright Labs*, www.seabrightlabs.com, 1 page (Date Unknown).

"STORGARD® Kit with DOME™ Trap," Storgard-Microsoft Internet Explorer Page, 1 page (Date Unknown).

"Structural Pest Control: Allure® Pheromone Beetle Traps (PT® 6)," *Whitmire Micro-Gen Research Laboratories* , http://www.wmmg.com/spc/spc-products-item.asp?id=117, 2 pages (Date Printed Apr. 27, 2004).

"Structural Pest Control: Prescription Treatment® brand Insect Monitor," *Whitmire Micro-Gen Research Laboratories*, http://www.wmmg.com/spc/spc-products-item.asp?id=198, 1 page (Date Printed Jul. 21, 2003).

"Structural Pest Control: Prescription Treatment® brand Avert® Cockroach Bait Stations," *Whitmire Micro-Gen Research Laboratories*, http://www.wmmg.com/spc/spc-products-item.asp?id=75, 1 page (Date Printed Jul. 21, 2003).

"Trapper® Monitor & Insect Trap," *Bell Laboratories, Inc.*, http://www.belllabs.com/cgi/products.cgi?op=p&nm=domepestmo, 1 page (Date Printed Jul. 21, 2003).

Trapper® Mouse Pro: Covered-Keeps Mice Out of Sight; Trapper® LTD: Captures Mice, Roaches, Insects; Trapper® Monitor & Insect Trap: Traps & Monitors Insects, *Bell Laboratories Inc.*, 1 page (Date Unknown).

"Victor® Roach Pheromone & Insect Trap: Patent Roach Pheromone Attractant: twice the trapping power and catch of the leading competitive monitors," *Woodstream*, www.woodstreampro.com 1 page (Date Unknown).

"Victor® Roach Trap and Monitor: A more simple, and effective method to monitor roaches, crickets and other crawling insects.," *Woodstream* , www.woodstreampro.com 1 page (Date Unknown).

* cited by examiner

INSECT SUPPRESSION STATION

FIELD OF THE INVENTION

The present invention is directed to a device for control of arthropod populations, especially insects, and more particularly to a reusable device for baiting, monitoring, or trapping insects, or any combination of these, that encloses insect suppression devices.

BACKGROUND OF THE INVENTION

Successful insect pest management strategies integrate multiple techniques including inspection, monitoring, and least toxic suppression means in order to provide effective, yet safe and sustainable reductions in pest populations. Monitoring pest insect populations is especially important to help determine population levels initially and throughout treatment regiments in order to most efficiently utilize pesticide applications. Baiting is utilized in conjunction with monitoring to suppress target insect populations as a less toxic pesticide formulation. Depending on the pest, the use of baits may decrease the need for or quantity of sprayed insecticide. Bait may be contained in a station in order to protect the bait from being washed away as well as to provide a variety of baits to the target pest.

Many devices for containing a poisonous bait to control arthopods, such as insects, are known. Simple cardboard enclosures with bait or glueboards on their interior allow access through open ends. In addition, reusable bait stations are also known that can be opened and closed to add poisonous bait to the interior. The use of pheromones and guide walls to lure and direct insects to bait is also known.

Insect stations are desirable to use in facilities such as restaurants that clean regularly with large quantities of water, limiting the life of baits and monitors not contained within stations. In addition, highly attractive stations are desirable where insects are drawn to the station at a high rate and are effectively dispatched with poisonous bait, glueboards, or other suppression devices.

Reusable traps save money by allowing refilling of poisonous bait or other suppression or monitoring devices without needing to replace the entire station. However, more effective devices that are simple to fill with fresh bait or glueboards are needed.

SUMMARY OF THE INVENTION

A reusable insect suppression station is provided for luring, monitoring, baiting or trapping insects or any combination of these functions that allows chosen insect suppression devices to be positioned within the station and to be removed and replaced when desired. A few examples of insect suppression devices or changeable pads that may be used with the station are a glueboard, a baited pad, a pad with a chemical attractant and a baited pad with a chemical attractant, such as a pheromone. The station may include two pad receiving areas. In one embodiment, the station includes a base with one pad area and a cover with a second pad area. The trap positions these two pad areas to be facing each other to allow for two changeable insect suppression devices to be used within one compact, discreet station. The cover may be opened to provide access to the first pad area and the second pad area. The station may include a water resistant material.

In a second embodiment of the invention, a reusable insect station includes a changeable pad area and includes an undercut portion along the circumference of the base that is adjacent to a mounting surface. The undercut portion reduces the amount of liquid that will enter the device when mounted on a vertical planar surface in areas where liquids are sprayed during cleaning.

In a third embodiment of the invention, a reusable insect station includes two changeable pad areas where one pad area includes a baited pheromone pad and the other pad area includes a glueboard. This embodiment has a removable cover for providing access to the pad areas. This insect station utilizes three insect suppression means simultaneously: chemical attraction, baiting, and trapping.

In a fourth embodiment of the invention, an insect station includes a pad area for receiving a removable and replaceable pad, a base, and a cover that enables access to the pad area. The base includes a mounting structure to permit mounting the station on a planar surface. The base further includes a wall access opening for positioning over an opening in the planar surface to provide access to the space behind the planar surface. This station can be used to facilitate the placement of suppression means behind a planar surface.

BRIEF DESCRIPTION OF THE DRAWINGS

The invention may be more completely understood by considering the detailed description of various embodiments of the invention that follows in connection with the accompanying drawings.

While the invention may be modified in many ways, specifics have been shown by way of example in the drawings and will be described in detail. It should be understood, however, that the intention is not to limit the invention to the particular embodiments described. On the contrary, the intention is to cover all modifications, equivalence, and alternatives following within the spirit and scope of the invention as defined by the claims.

DETAILED DESCRIPTION OF THE VARIOUS EMBODIMENTS

The present invention is believed to be applicable to a variety of systems and methods for controlling insect populations. The invention has been found to be particularly advantageous in application environments where a durable reusable insect suppression station is used to control insect populations. While the present invention is not so limited, an appreciation of the various aspects of the invention is best gained through a discussion of various application examples operating in such an environment.

The invention is focused on suppression of arthropods including insects, though for convenience, the term insects will be used throughout to refer to insects and other terrestrial arthropods related to insects, including but not limited to as centipedes, mites, spiders, and ticks.

Figure 1:
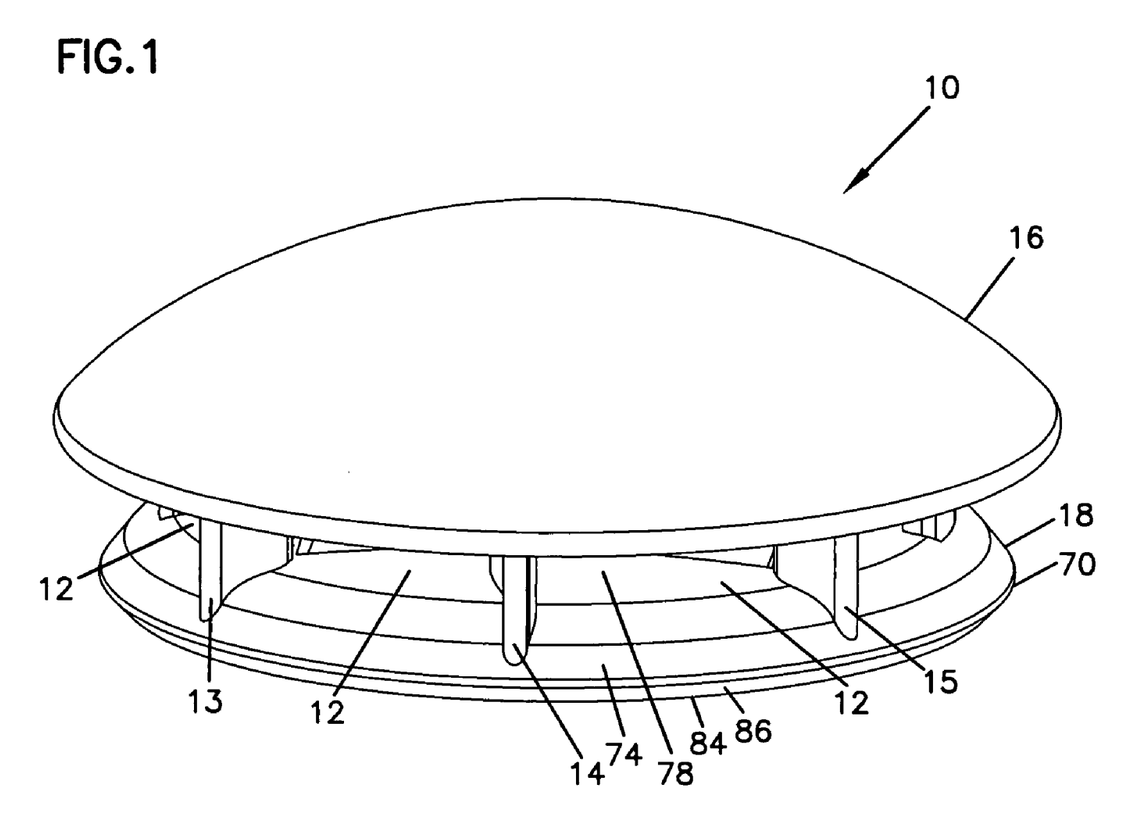
FIG. 1 is a top perspective view of one embodiment of an insect station of the present invention.

FIG. 1 illustrates one particular embodiment of an insect suppression station 10 of the present invention. The station is used to provide insect access to luring devices, poisonous bait, trapping devices or monitoring devices, or any combination of these. An insect suppression station refers to a structure that is used to bait insects, monitor insects or trap insects, or any combination of these. Often in the insect suppression field, the term station implies a structure that contains food bait, but as used herein, a station may refer to a structure that does not include bait. For example, the station may only include one or more glueboards, pools of oil, insecticide or other monitoring and trapping devices, without any bait.

Within the station 10, changeable insect suppression devices or pads are positioned to provide insects with access to bait or trapping devices. Insects enter the station 10 through access openings 12 in the side of the station 10. The access openings 12 are bordered by guide walls 14. The guide walls provide a structure for the insects to crawl next to as crawling insects feel most comfortable in corners and along walls. As a crawling insect proceeds along beside a guide wall 14 the insect will be directed to an insect suppression device within the station 10.

The station of FIG. 1 may be used to control many different types of insect population, including both crawling and flying insects. The device is particularly well suited to crawling insects such as cockroaches, ants, bedbugs, beetles and others. Flying insects may also be controlled using the station 10, including filth flies, fruit flies, biting flies, stored product pests and others. The station 10 has been found to be particularly effective for the control of cockroaches.

The station 10 may contain one, two or more changeable insect suppression devices or pads for controlling or monitoring insects. As the term is used herein, an insect suppression device or pad means a device that is used in the process of attracting, trapping, monitoring or baiting insects, or any combination of these, whether the trapping is used for monitoring purposes or to control the population. Examples include glueboards, cardboard pads, plastic pads, sensors and absorbent pads, where each structure may have either bait or a chemical attractant or both applied to it. Other examples of insect suppression devices are a reservoir of oil that will trap insects, a gel or other substance that the insects will stick to, a toxicant strip of plastic impregnated with insecticide, an insecticide compound such as a dust, or insecticide in any form. An insect pheromone is one example of a chemical attractant that may be used. The station 10 shown in the FIGURES provides two areas for receiving these types of changeable pads although alternatively only one area or more than two areas may be provided. The station 10 may be used with one pheromone pad and one glueboard, two glueboards, two pheromone pads, or with any of these combinations with bait provided on the pad.

The station 10 may also be used with sensors that do not trap insects. One example of this type of sensor is described in U.S. Patent Application Publication No. US-2003-018442, titled METHOD AND APPARATUS FOR CAPACITIVELY SENSING PESTS, filed Mar. 27, 2003. A sensor as described in that publication may be positioned within one of the areas for receiving insect suppression devices within the station 10. It is also possible to position more than one insect suppression device within each of the areas for receiving insect suppression devices. For example, a pheromone pad or chemical attractant pad could be positioned beneath a glueboard in one of the areas.

Figure 2:
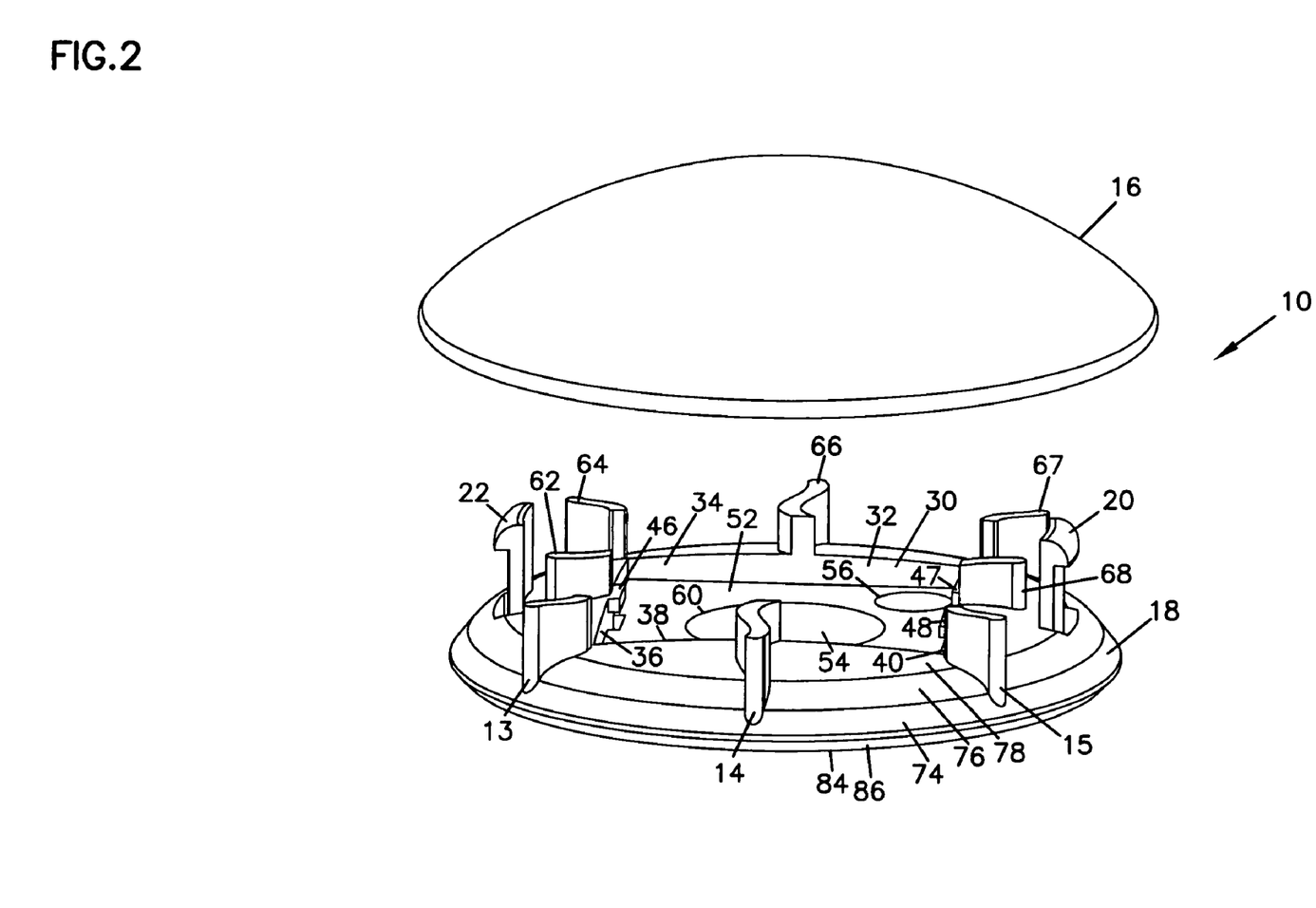
FIG. 2 is an exploded perspective top view of the station of FIG. 1.

FIG. 2 shows an exploded view of the station 10 where a lid 16 is removed from a base 18 to provide access to the areas for receiving the changeable pads. The base includes first and second attachment devices or tabs 20, 22 for connecting the base 18 to the lid 16. The attachment devices 20, 22 are received by structures in the lid 16, such as a rim, which will be described further herein with reference to FIG. 6. In one embodiment, the cover is deformable between a first attached position and a second removing position. In the first attached position, structure on the cover interacts with structure on the base to secure the cover to the base. The base may be deformed manually to a second position for removing it where the cover and the base structure are no longer in engagement with each other. In one example, the lid 16 is squeezed along an axis of the station 10 that is at a right angle to the axis formed by the attachment devices 20, 22. Squeezing the lid 16 along this perpendicular access deforms the lid 16 so that its rim is no longer secured to the base 18 by the attachment devices 20, 22. To facilitate removal of the lid 16, it is preferred that the lid 16 is made of a more flexible material than the base 18. Alternatively, the cover may be structured to be attached to the base by a hinge so that is pivoted into an open position to allow access to the changeable pad areas. Many other configurations of a base and openable cover are also possible. The base 18 may be made of a fairly rigid plastic material, such as high impact plastic or ABS plastic, while the lid 16 is made of a plastic that is more flexible than the base 18. In one embodiment, the base and lid materials are water resistant and/or impact resistant. Some examples of base and lid materials are thermoformed plastics such as high impact polypropylene (HIPP), and acrylonitrile butadiene styrene (ABS). Other possible materials include polychlorotrifuoroethylene (PCTFE), polyvinylidene chloride (PVDC), or high-density polyethylene (HDPE). In addition, the station may be formed of non-plastic materials such as wax paper board, galvanized metal, aluminum, and wood.

The base 18 includes a first receiving area 30 for receiving a changeable pad. The first receiving area 30 shown in FIG. 2 includes a recessed area 32 defined by four walls 34, 36, 38, 40. In this example, the first receiving area 30 is a square area with dimensions of about 1.5"×1.5". This receiving area 30 or well may take many different forms in alternative embodiments of the invention. For example, wells of different sizes could be used, square wells of about 1"×1", 2"×2", or 3"×3" are also possibilities. Alternatively, the first receiving area 30 may be circular, oval, rectangular, or other shapes. In other alternatives, the receiving area 30 may be flush with the remainder of the base 18 instead of being recessed. In another alternative, the receiving area 30 could be a raised area.

Figure 3:
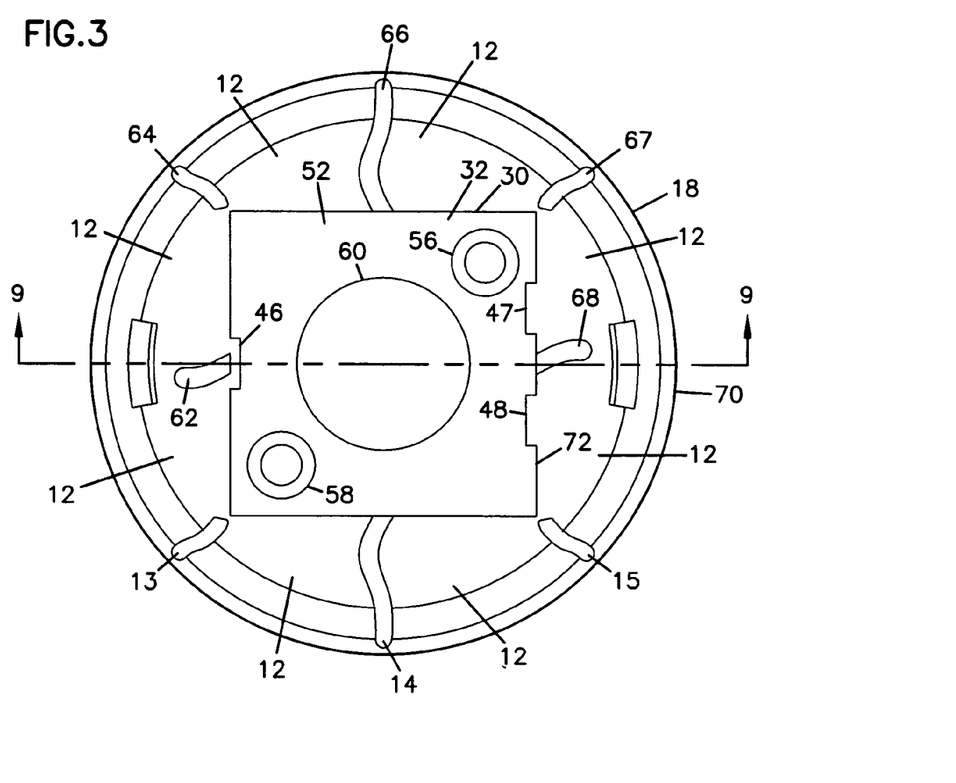
FIG. 3 is a top view of a base component of the station of FIG. 1.

The receiving area 30 may also include tabs 46, 47, 48. The tabs 46, 47, 48 may retain a changeable pad in the first receiving area 30. FIG. 3, a top view of the base 18 provides a representation of how the tabs are positioned within the first receiving area 30. The tabs are especially useful when the station 10 is mounted on a vertical surface. Other structures may alternatively be used to retain the changeable pads.

Now referring to FIGS. 2 and 3, the floor 52 of the first receiving area 30 includes an access opening 60 and two mounting openings 56, 58. The mounting openings 56, 58 may be used to secure the trap 10 to a planar surface using screws, or nails or other attachment devices. The station 10 may be secured to a planar surface, such as a wall, in order to insure that it will remain in a location where insects are likely to encounter it. Alternatively, the station 10 may simply be placed on the floor without attaching it to a structure. Also, many different attachment or mounting devices may be used to secure station 10 to a planar surface or another surface. For example, two sided adhesive products, magnets, or hook and loop fasteners may be used.

Also present on the floor 52 of the first receiving area 30 is an access opening 60 defining an open area 54. The access opening 60 may be used to provide a discreet access point for the area behind a wall or other surface where insects may be present. The access opening 60 may be positioned over an opening in a wall when the station 10 is attached to a wall. In this configuration, a spray tip may be inserted into the access opening 60 to apply insecticide or other suppression means for controlling insects inside a wall. When the lid 16 is in place over the base 18, the access opening would not be visible. The method and devices for using access opening 60 will be discussed in more detail with respect to FIG. 11.

The base 18 includes guide walls to direct insects toward the first receiving area 30 so that they are most likely to interact with the suppression means that is located there. Many crawling insects, such as cockroaches, prefer to walk along edges and the guide walls utilize this behavior to direct the insects toward bait or other suppression means. Many different configurations for guide walls are possible so that the access openings defined between the guide walls are sufficiently large to allow the insects to pass through, and sufficiently close to make it likely that an insect will encounter a guide wall and follow it to the suppression means. Alternatively, guide arms may extend from the insect station to increase the likelihood that insects will be directed toward the suppression means. Bait may be placed along the edges of guide arms or guide walls.

Figure 4:
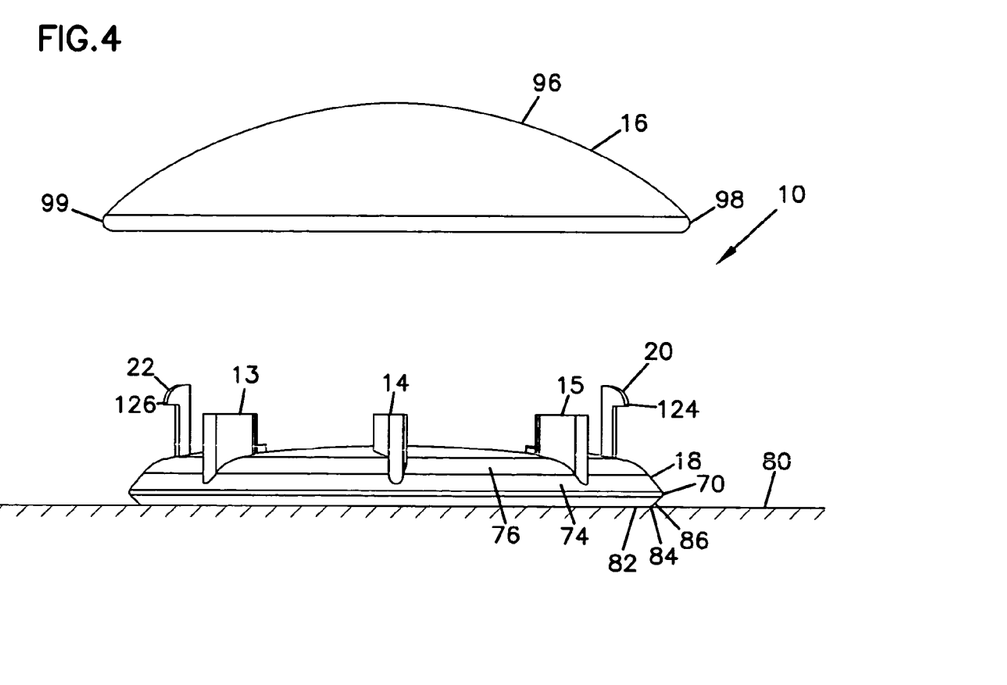
FIG. 4 is a side exploded view of the station of FIG. 1.

As shown in FIG. 2, eight guide walls 13, 14, 15, 62, 64, 66, 67, 68 may be provided spaced around the first receiving area 30. The length of each guide wall varies depending on the distance between the outer rim 70 of the base 18 and the outer perimeter 72 of the first receiving area 30. Six of the guide walls 13, 15, 62, 64, 67, 68 are shorter than two of the guide walls 14, 66. In the embodiment of FIG. 3, the guide walls follow a curving path toward the first receiving area 30. It is also possible to provide straight guide walls or guide walls with a different curved or angled path. If the guide walls provide a path from an outer rim of the base toward the suppression means, they are likely to increase the effectiveness of the station. FIG. 4 shows a side view of three of the guide walls 13, 14, 15. Near the perimeter 72 of the receiving area 30, the height of the guide walls is about 0.25 cm to 2.0 cm, preferably 0.5 cm to 1.0 cm. This height is chosen to provide sufficient distance from the base 18 to the lid 16 so that the insects will be able to pass easily through the opening. The height of the guide walls is also chosen so that the station 10 has a fairly low profile and discrete appearance.

Access openings for the insects are defined between the guide walls. The dimensions of the spacing between the guide walls are chosen to allow insects to easily pass through the openings defined between the guide walls while still providing a small compact station. In one embodiment, the spacing between the guide walls is about 2.5 or 3 cm. Alternatively, the spacing between the guide walls could be about 1 cm, about 2 cm, about 3.5 cm, or other distances within the range of 1 cm to 5 cm.

As crawling insects approach the station 10, they first encounter the outer rim 70, they then proceed to walk up an inclined surface 74 (FIG. 4), which is angled in relation to the mounting surface. Adjacent to the first angled surface 74 is a second angled surface 76, which tapers toward a horizontal surface 78 (FIG. 2) surrounding the first receiving area 30. The inclined surfaces 74 and 76 accommodate the elevation of the first area above the planar surface where the station 10 is mounted. This elevation provides increased protection from liquid that is sprayed toward or is otherwise present on the planar surface.

FIG. 4 shows the base 18 attached to a planar mounting surface 80. When the base 18 is mounted on a planar mounting surface 80, the back 82 of the base 18 is adjacent to the mounting surface 80. The back 82 has an outer perimeter 84. The back 82 of the base 18 has an outer perimeter 84 with a smaller diameter than the outer perimeter of the outer most rim 70 of the base 18. As a result, the base includes an angled frustroconical surface extending from the outer perimeter 84 of the back 82 to the outer most portion 70. This angled surface is useful in protecting bait in the first receiving area 30 from water. The angled surface or under cut deflection surface 86 provides protection from water running down the mounting surface 80, so it is less likely to flow over the first receiving area 30. If the station 10 is mounted in a kitchen area, the kitchen may be cleaned by hosing down certain walls and surfaces. If liquid from this type of activity were to run over the first receiving area 30, they could come into contact with the bait, making the bait less desirable for the insects. However, much of the liquid running down the mounting surface 80 will instead follow the under cut deflection surface 86 around the base 18, reducing bait contamination. Other structures could also be used to protect the bait in the first receiving area, such as a lip around the receiving area.

Figure 5:
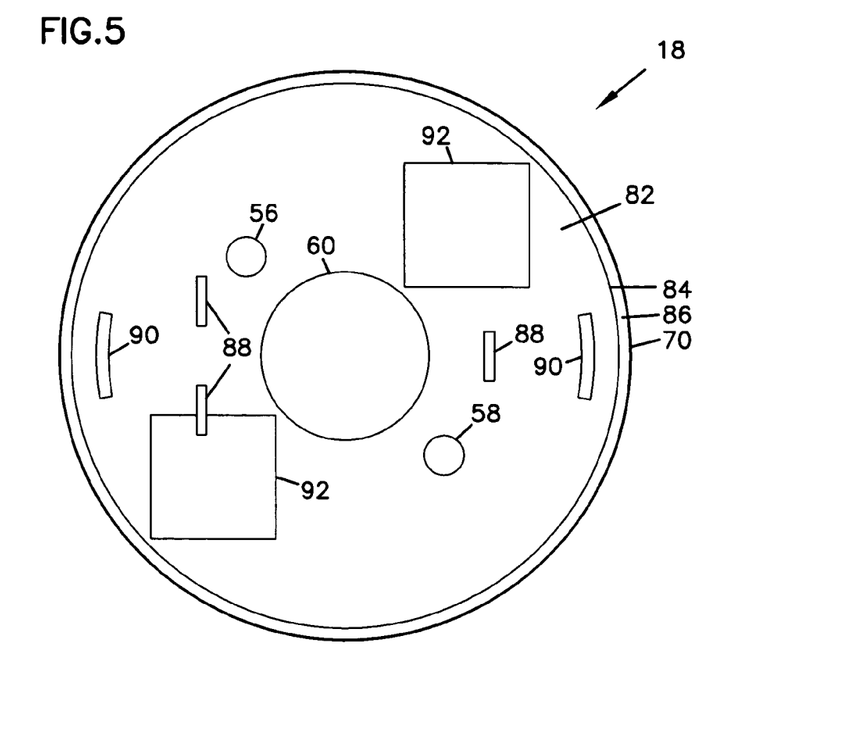
FIG. 5 is a bottom view of the base component of FIG. 3.

FIG. 5 shows a back view of the base 18 including the backside 82, outer perimeter of the backside 84, under cut deflection surface 86 and outermost rim 70. The mounting openings 56, 58 and the wall access opening 60 are also visible in this view. In addition, molding features 88 are present to facilitate the molding of the tabs 46, 47, 48 in the first receiving area 30 (FIG. 2). FIG. 5 also illustrates molding features 90 that facilitate the molding of the attachment devices 20, 22 and molding features 92 that facilitate the molding of the base 18.

The lid 16 of the station 10 protects the changeable pads within the station from contact with liquid, contact with non-target animals, and from incidental contacts with people. The lid 16 includes a domed portion 96 and an outer lip 98. The dome 96 helps shed water that may contact the station 10. The outer lip 98 preferably has an outer diameter that is slightly larger than the diameter of the outer rim 70 of the base 18. Where the outer lip 98 of the cover 16 extends beyond the outer rim 70 or the base 18, an overhang portion 99 is defined in the cover 16. Because the lid 16 will be slightly larger than the base 18, water running off of the dome 96 will be directed away from the first receiving area 30.

The station 10 has an overall circular configuration in the embodiment shown in the FIGURES. However, other shapes are also possible for the station 10. For example, the station may have an oval, square, rectangular, or trapezoidal shape. In one alternative of these embodiments, the cover will extend beyond the outer boundary of the base to create an overhang portion so that the internal receiving area or areas are less likely to come into contact with liquid.

Figure 6:
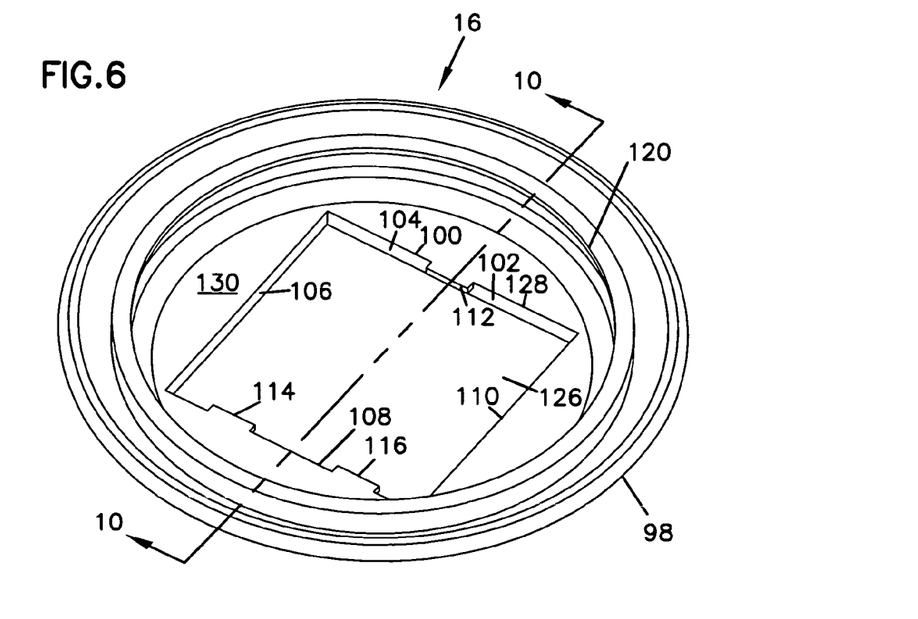
FIG. 6 is a bottom perspective view of a lid of the station of FIG. 1.
Figure 10:
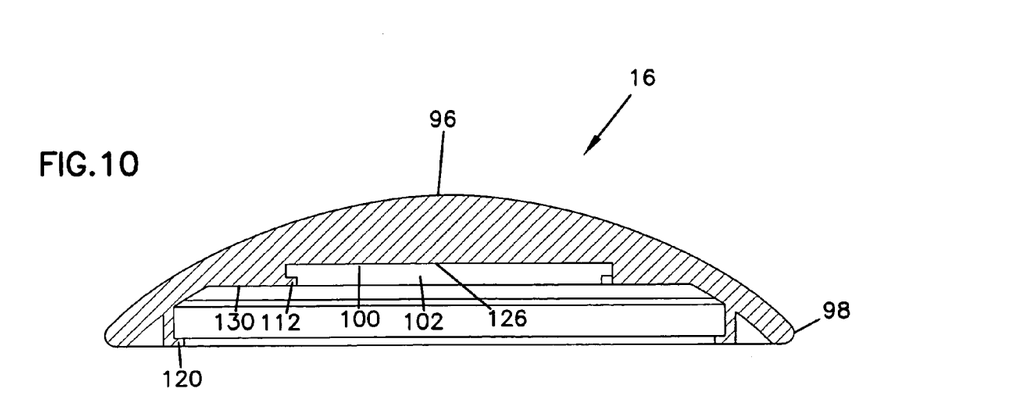
FIG. 10 is a cross-sectional view of the cover of FIG. 6 taken along line 10—10 in FIG. 6.

The lid 16 includes a second receiving area 100 on its bottom side, as shown in FIGS. 6 and 10. Similar to the first receiving area 30, the second receiving area 100 is designed to receive a changeable pad, such as a pad with bait, a pheromone pad, a pheromone pad with bait, or a glueboard. The changeable pad is received in the recess 102 of the receiving area 100. In the embodiment shown in FIG. 6, four walls 104, 106, 108, 110 border the recessed area 102. The second receiving area 100 also includes three tabs 112, 114, and 116 to help retain a changeable pad within the first receiving area 100. Similar to the first receiving area, there are many different options available for the size, and shape and configuration of the second receiving area.

In the alternative shown in the FIGURES, a suppression device that fits within the first area may also be received by the second area. As a result, the suppression devices may be interchangeably positioned in the two areas. In the embodiment shown in the FIGURES, the first and second areas are similarly sized and shaped to facilitate this interchangeability. The interchangeability of devices in the two areas may result in increased convenience for a person maintaining the station.

Figure 9:
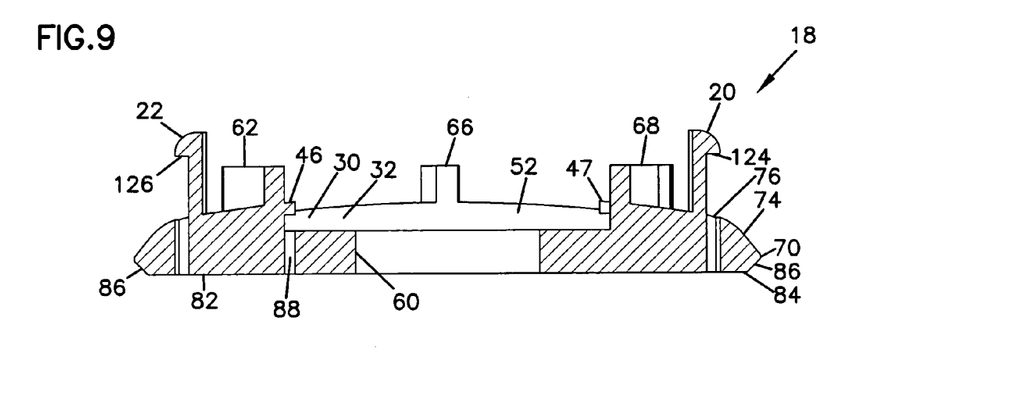
FIG. 9 is a cross-sectional view of the base component of FIG. 3, taken along line 9—9 in FIG. 3.

The lid 16 also includes an attachment rim 120 for interfacing with attachment devices 20, 22 on the base 18. Each attachment device 20, 22 includes a projection 124, 126, respectively, as shown in FIG. 9. This projection interfaces with rim 120 to hold the lid 16 onto the base 18.

The second receiving area 100 of the cover shown in FIGS. 6 and 10 also includes a floor 126 of the receiving area. The receiving area defines a perimeter 128. A planar surface 130 is adjacent to and surrounds the perimeter 128 of the receiving area.

Figure 7:
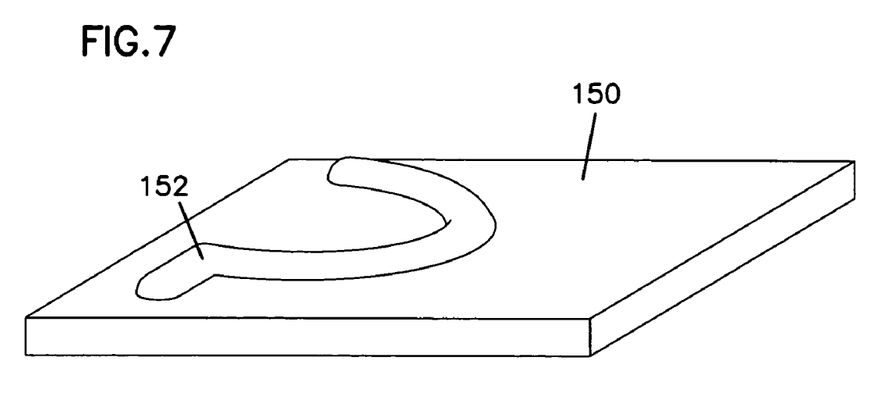
FIG. 7 is a top perspective view of a changeable pad with bait for use with the insect station of FIG. 1.

One example of an insect suppression device or pad that could be used in either the first receiving area 30, the second receiving area 100 or both receiving areas is shown in FIG. 7. The insect suppression device or pad 150 may be a device for attracting, monitoring, trapping or baiting an insect, or it may accomplish any combination of these functions. For example, the pad 150 may be an insect sensor or a glueboard for trapping insects. Alternatively, the pad 150 may include a chemical attractant. The changeable pad 150 may include a portion of insect bait 152. Examples of changeable pad materials include polystyrene, cardboard or absorbent materials.

Suitable woven and nonwoven materials for an absorbent pad include natural fibers (e.g., wood or cotton fibers), synthetic fibers such as polyolefins (e.g., polyethylene and polypropylene), polyesters, polyamides, and synthetic cellulosics (e.g., RAYON™ material), or from a combination of natural and synthetic fibers. Such synthetic fibers can be manufactured using known processes such as carded, spunbond, meltblown, airlaid, needle punched and the like. For example, the absorbent material may include cotton batting, fiberized cellulose wood pulp, synthetic batting, polyester batting, felt, bonded carded webs, high loft spunbond materials, and commingled cellulose wood pulp and polypropylene materials. Some examples of acceptable absorbent materials are described in Published US Patent Application U.S. Pat. No. 2,003,0127108, which is hereby incorporated by reference.

Where an absorbent material is used for the pad, any bait on the pad may be somewhat protected from incidental contact with moisture because the pad may hold some moisture away from the bait. In one alternative, the pad may include both an absorbent material and a cover including materials like spunbonded nonwoven material, apertured formed thermoplastic film, hydroformed thermoplastic film, porous foams and thermoplastic scrims.

One benefit of using a cover is that it may allow a liquid chemical attractant, such as a pheromone, to pass through it and be absorbed into the pad. The active pheromone composition is often suspended in a liquid solvent, which can then be evaporated away using heat or dry air, etc, leaving only the pheromone chemicals. The pheromone chemicals are then embedded within the pad, and protected by the pads cover. This arrangement will reduce the likelihood that when insects walk on the pad, the pheromones are carried away with them. The pheromones stay in the pad extending attraction efficacy. The cover may also serve to protect the bait from moisture in the pad.

Any of these changeable pad materials may include a chemical attractant to lure insects to the station. Many different types of chemical attractants are known including food based attractants and pheromones.

One preferred type of pheromone to use with the changeable pad 150 is an ethanol extract of cockroach feces that is available from Woodstream Corporation and is well suited for attracting cockroaches. Instead of a liquid pheromone being applied to an absorbent pad, another structure including the pheromone may be attached to the changeable pad 150. For example, pheromone is commercially available in a woodchip, a polystyrene panel, or a small pill-like cylinder, for example as produced by Woodstream Corporation. One of these pheromone containing structures could alternatively be attached to a changeable pad 150.

The pad 150 may alternatively be made of many different materials, such as cardboard, paper, plastic, or other materials that could receive a portion of bait and fit within the receiving areas. The pad may be disposed of after use for a period of time or may be reused by periodically reapplying bait and/or chemical attractant to the pad.

When bait 152 is applied to the changeable pad 150 it is frequently in a gel or paste form. Examples of cockroach bait that may be used with the station include MaxForce H cockroach bait produced by Bayer Environmental Science, New Jersey, and ECO2000-FB CRTU, ECO2000-RX or ECO2000-XP produced by Ecolab Inc., St. Paul, Minn.

Figure 8:
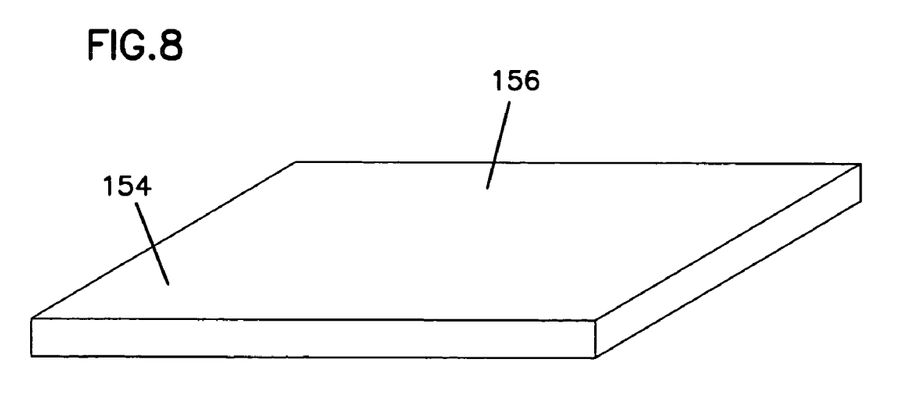
FIG. 8 is a top perspective view of a changeable glueboard for use with the insect station of FIG. 1.

Another type of changeable pad that may be used in the receiving areas 30, 100 is a glueboard 154 including adhesive 156 on one surface as shown in FIG. 8. The use of a glueboard in one of the receiving areas of the station allows for monitoring and estimating of the insect population. Any insects captured on the glueboard 156 within one of the receiving areas 30, 100 of the station 10 will not be visible because it is contained within the station 10. This configuration provides visual evidence of any insect presence, but reduces the likelihood that a customer or other casual observer of the trap will be able to see any captured insects.

Figure 11:
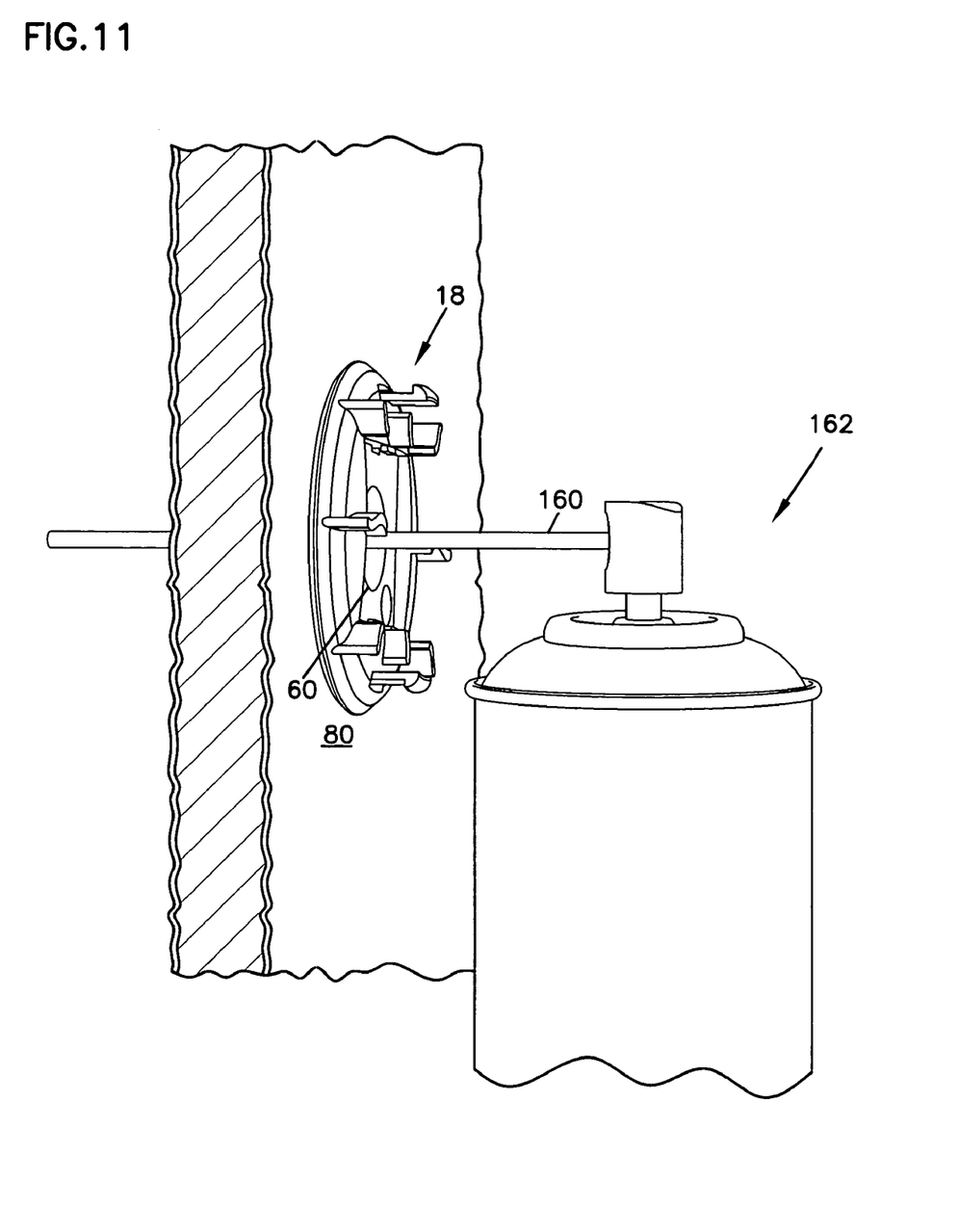
FIG. 11 is a side perspective view of the base of FIG. 3, as it would be used to provide behind the wall access for a spray applicator.

FIG. 11 shows a spray nozzle 160 inserted into the access opening 60 of the base 18. A spray device 162 is used to spray insecticide behind the planar mounting surface 80. The use of the access opening 60 to spray insecticide into the void behind planar mounting surface 80 can be used to help eliminate cockroaches or other insects that have infested an area and are located in difficult to access areas. When the cover is on the base, the access opening is not visible, maintaining the professional appearance of the environment.

The wall access opening may also be useful for presenting an insect suppression device, such as bait or insecticide to insects within the wall void. A changeable pad may be positioned within the second receiving area 100 with bait, attractant, or adhesive on the side closest to the back side 82 of the base 18. As a result, insects within a void area behind a wall, ceiling, floor or other surface would have access to the changeable pad through the access opening 60.

Figure 12:
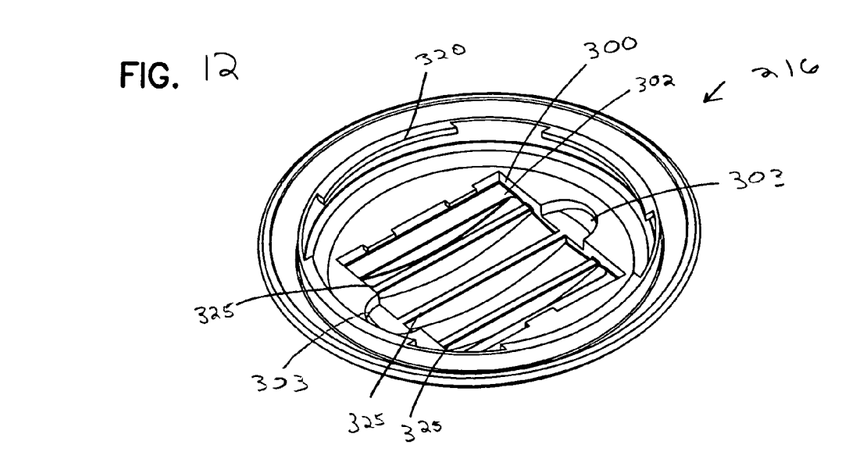
FIG. 12 is a bottom perspective view of a cover of a second embodiment of an insect station of the present invention.
Figure 13:
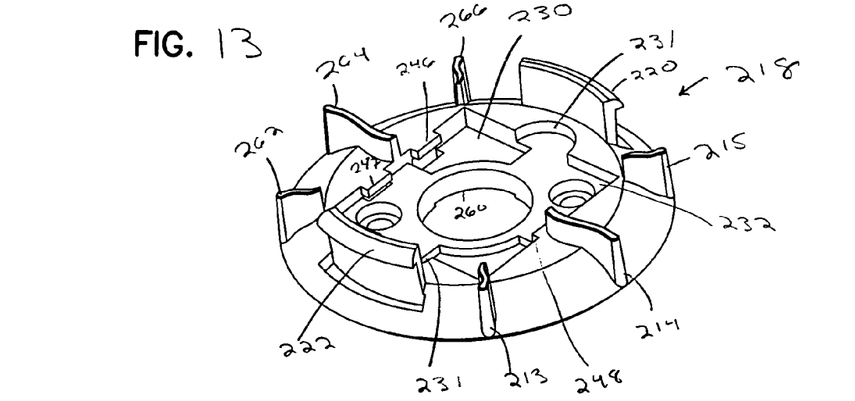
FIG. 13 is a top perspective view of a base of the second embodiment of the invention.
Figure 14:
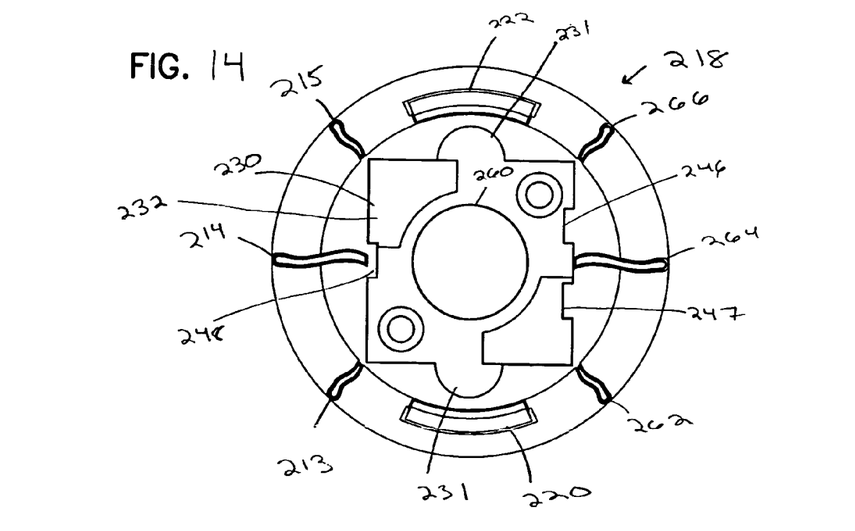
FIG. 14 is a top view of the base component of FIG. 13.

FIGS. 12–14 show a base 218 and a cover 216 of an alternative embodiment of an insect suppression station. This alternative embodiment is similar to station 10 shown in FIGS. 1–10, but contains a few additional features. A first receiving area 230 of the base 218 includes depressions 231 that are adjacent to the perimeter of the first receiving area 230. The depressions 231 will enable a user to more easily grasp a changeable pad that is positioned within the recessed area 232 of the base 218. Like station 10, the base 218 includes attachment devices 220 and 222, guide walls 213, 214, 215, 262, 264 and 266. The base 218 also includes an access opening 260 and tabs 246, 247 and 248.

The cover 216 includes a second receiving area 300 having a recessed area 302. Adjacent to the second receiving area 300, depressions 303 are defined that will facilitate grasping a changeable pad within the recessed area 302. The cover 216 also includes an attachment rim 320 for interfacing with attachment tabs 220 and 222 on the base 218. The attachment rim 320 is not continuous around the perimeter of the cover 216.

The supporting surface of second receiving area 300 is defined by the top surface of ridges 325. Ridges 325 improve the ease of the molding process compared to having a solid portion form the floor of the second receiving area 300.

During the use of an insect station such as station 10 or station 216, a user will determine an appropriate location for the station. The base may be simply placed on a floor or other surface or the base may be mounted to a surface such as a floor, wall, ceiling, or other surface. Screws through mounting holes may be used to mount the base or alternative mounting devices may be used such as hook and loop fasteners, magnets or adhesive.

Selected insect suppression devices are positioned within the receiving areas. A user may position many diffrent permutations of devices within the receiving area or receiving areas of the station. For example, a user may position an attractant pad within the first receiving area and apply a paste formulation of insect bait to the attractant pad. A glueboard may then be installed within the second receiving area on the cover. Alternatively, the many diffrent insect suppression devices mentioned herein may be positioned in the receiving areas.

When the desired number of insect suppression devices are positioned within the base and cover, the cover is attached to the base by snapping it into place, so that the attachment devices interact with the rim on the cover. Alternatively, many different attachment methods may be used to secure the cover to the base.

Periodically, the station will be checked and maintained. The user may remove the cover by squeezing the cover to disengage the attachment rim from the attachment devices. Once the cover is removed, the receiving areas can be accessed. The user might apply fresh bait to a pad within one of the receiving areas without removing the pad from the area. Similarly, fresh chemical attractant or pheromones may be applied to a changeable pad without removing the changeable pad. Alternatively, the changeable pad may be removed from the station and replaced with a new pad. For example, a glueboard that has trapped insects may be removed and a fresh clean glueboard may be replaced within the receiving area.

In one alternative method of use, a changeable pad may be positioned within the first receiving area on the base so that bait or insecticide is accessible to insects in a void behind the surface on which the station is mounted. Bait or insecticide or other suppression means may also be positioned to be accessible to insects within the station.

The above specification provides a complete description of the manufacture and use of the invention. Since many of the embodiments of the invention can be made without departing from the spirit and scope of the invention, the invention resides in the claims.

What is claimed is:

1. A reusable insect suppression station for baiting or trapping or monitoring insects or any combination of these functions that enables chosen insect suppression devices within the station to be removed and replaced, comprising:
   (a) a base that is mountable on a vertical surface, the base including:
      (i) a first area for receiving a first removable and replaceable insect suppression device; and
      (ii) an angled frustoconical surface extending from the outer perimeter of the base; and
   (b) a cover attachable to the base including:
      (i) a second area for receiving the first insect suppression device or an optional second removable and replaceable insect suppression device, wherein the second area includes a recessed area having structure integral with the cover, and configured to retain the first or second insect suppression device, and
      (ii) an overhang portion that extends beyond the base; and
   (c) at least one insect suppression device located in the first or second area for receiving a removable and replaceable insect suppression device,
   wherein, when the cover is attached to the base, the second area is positioned to be spaced from the first area and the station encloses the first and second areas on at least two sides; and
   wherein, after the cover is attached to the base, the cover is movable to allow access to the first and second areas for removing or replacing the insect suppression device.

2. The station of claim 1, wherein the vertical surface is planar and the base is configured to conform to the planar vertical surface at an outside edge of a back surface.

3. The station of claim 2 wherein the vertical surface includes holes for receiving an attachment device.

4. The station of claim 1 further comprising guide walls to direct insects toward the first area.

5. The station of claim 1, wherein the station defines two or more insect entry areas around the first area.

6. The station of claim 1, wherein the first area includes a recessed area for receiving the first insect suppression device and tabs for retaining the first insect suppression device.

7. The station of claim 6 further comprising a first depression adjacent to the first area to facilitate placement of and removal of the first insect suppression device.

8. The station of claim 7 further comprising:
a second depression adjacent to the second area to facilitate placement of and removal of the second insect suppression device.

9. The station of claim 1, wherein said structure integral with the cover includes tabs for retaining the second insect suppression device.

10. The station of claim 1 wherein the first and second areas are the same shape and size.

11. The station of claim 1, wherein the first or second insect suppression device includes an insect attractant.

12. The station of claim 11 wherein the first or second insect suppression device includes polystyrene and the insect attractant.

13. The station of claim 11 wherein the first or second insect suppression device includes an absorbent material and the insect attractant.

14. The station of claim 11 wherein the insect attractant comprises pheromone.

15. The station of claim 1, further comprising the first or second insect suppression device including an adhesive for capturing insects.

16. The station of claim 1 further comprising:
the first or second insect suppression device including a detector of insect presence.

17. The station of claim 1 further comprising:
a glueboard pad positioned in one of the first or second areas,
a pheromone pad positioned in the other of the first or second areas; and
insect bait positioned on the pheromone pad.

18. The station of claim 1 wherein the station is made from a water resistant material.

19. The station of claim 1 wherein the station is made from an impact resistant material.

20. The station of claim 1 wherein the station is made from plastic.

21. The station of claim 1 wherein the station includes an outer domed portion.

22. The station of claim 1 further comprising a vertical device selected from the group of a hook and loop fastener system, a magnet, screws, adhesive and nails.

23. The station of claim 1 wherein the station includes a back side and a widest portion spaced from the back side, wherein a perimeter of the back side and the widest portion are both substantially circular, wherein the outer diameter of the back side is less than the outer diameter of the widest portion to define a cutaway portion.

24. The station of claim 1 wherein the cover is configured to be removed from the base.

25. The station of claim 24 wherein the cover is deformable between a first attached position and a second position removing it.

26. The station of claim 25 the cover further comprising a rim and the base further comprising attachment tabs, wherein the attachment tabs interact with the rim to secure the cover to the base when the cover is in the first attached position.

27. The station of claim 26 wherein the cover is deformed between the first and second positions by squeezing the lid along a first axis to bring the rim out of engagement with the attachment tabs.

28. An insect station for baiting or trapping or monitoring insects or any combination of these functions that enables an insect suppression device within the station to be removed and replaced, comprising:
a first area for receiving a first removable and replaceable insect suppression device;
a second area for receiving a second removable and replaceable insect suppression device;
at least one insect suppression device located in the first or second area for receiving an insect suppression device;
a cover that enables access to the first area and second area for removal and replacement of the insect suppression device wherein the cover includes a recessed area and an overhang portion that extends beyond the first area; and
a back side for vertical the station on a planar surface comprising a vertical structure, wherein the station defines a frustoconical surface extending from the outer perimeter of the back side to deflect water running down the planar surface from the first area.

29. The station of claim 28 further comprising guide walls to direct insects toward the first area.

30. The station of claim 28, wherein the first area includes a recessed area for receiving the first insect suppression device and tabs for retaining the first insect suppression device.

31. The station of claim 28, wherein the first suppression device includes an insect attractant.

32. The station of claim 31 wherein the insect attractant comprises pheromone.

33. The station of claim 28 wherein the station is made from a water resistant material.

34. The station of claim 28 wherein the station is made from an impact resistant material.

35. The station of claim 28 wherein the station is made from plastic.

36. The station of claim 28 wherein the cover includes an outer domed portion.

37. The station of claim 36 wherein the cover has an overhang portion that extends beyond an outer boundary of the first area.

38. The station of claim 28 wherein the cover is configured to be removed from the first area by squeezing the cover along a first axis.

* * * * *

UNITED STATES PATENT AND TRADEMARK OFFICE
CERTIFICATE OF CORRECTION

| | | |
|---|---|---|
| PATENT NO. | : 7,165,353 B2 | Page 1 of 1 |
| APPLICATION NO. | : 10/697705 | |
| DATED | : January 23, 2007 | |
| INVENTOR(S) | : Emory Matts et al. | |

It is certified that error appears in the above-identified patent and that said Letters Patent is hereby corrected as shown below:

Column 12, Line 24, "a back side for vertical the station on a planar surface comprising a vertical structure," should read --a back side for mounting the station on a planar surface comprising a mounting structure,--

Signed and Sealed this

Twenty-fourth Day of April, 2007

JON W. DUDAS
*Director of the United States Patent and Trademark Office*